July 11, 1944.                B. C. PLACE                 2,353,583
                      WIDE MOLDING SNAP-ON CLIP
                        Filed July 31, 1941
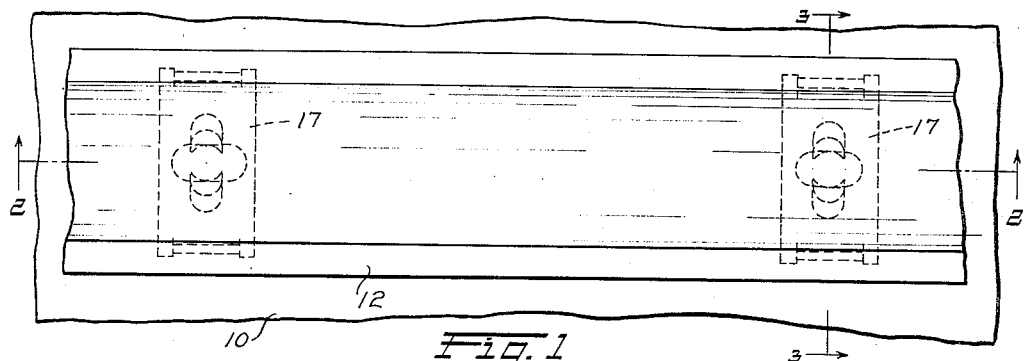
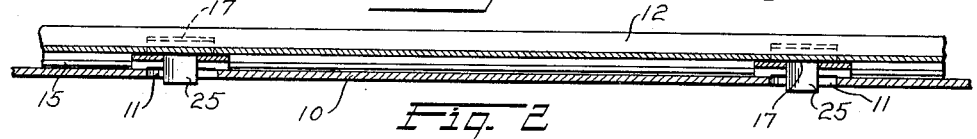
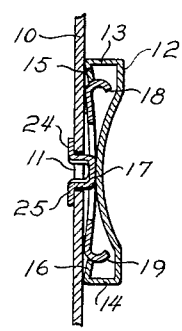 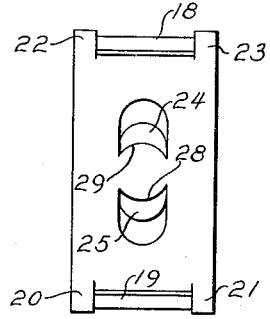 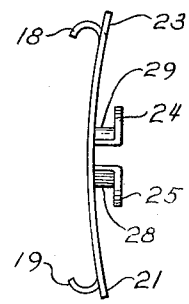
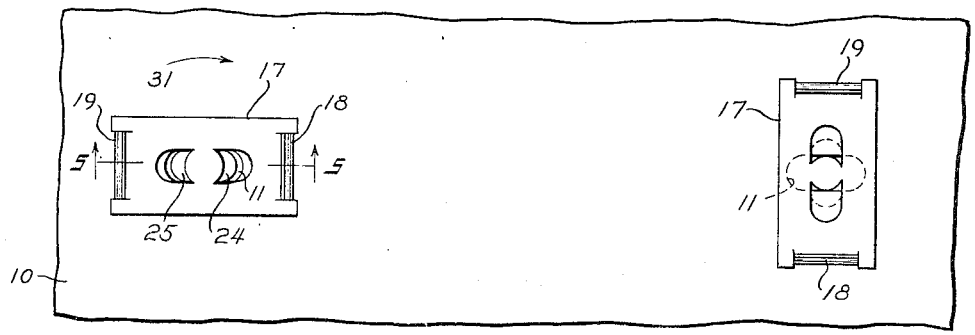
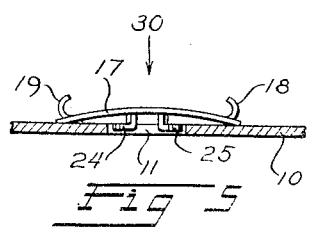
Inventor
Bion C. Place
By Strauch & Hoffman
Attorneys Patented July 11, 1944

2,353,583

UNITED STATES PATENT OFFICE 2,353,583

WIDE MOLDING SNAP-ON CLIP

Bion C. Place, Detroit, Mich., assignor of one-half to George E. Gagnier, Detroit, Mich.

Application July 31, 1941, Serial No. 404,916

3 Claims. (Cl. 24—73)

This invention relates to the securing of flanged moldings of the character widely used in the ornamentation and finishing of automobiles or the like. More particularly, the invention is concerned with a fastener and method of attaching moldings that is capable of successful use in securing moldings of unusual widths.

Considerable difficulty has been encountered in the satisfactory securement of moldings to automobiles or the like, when the moldings assume substantial width. In the attachment of such moldings fastening devices or clips are interposed between the supporting structure and the molding, the fastening devices or clips being formed for attachment to the supporting structure through openings therein and other parts thereof being shaped to fixedly engage the molding. It has been found that when the moldings are wide it is not practicable in some instances to use fastening devices or clips between the molding and supporting structure of types, that are entirely satisfactory in the securing of relatively narrow moldings, by merely making the fastening devices or clips in larger sizes.

For example, many moldings are attached by means of fastening clips, each of which is designed for attachment to the supporting structure by the upsetting of portions of a protuberance that is inserted in the fastener receiving opening in said structure. The clips of the latter character must of necessity be constructed of relatively thin metal to permit the upsetting operation to be performed; but when such metal has been used, it has been found that it is too flimsy to have a portion thereof used as an adequate means of attachment of a wide molding.

Furthermore, in view of the additional weight of wide moldings it is desirable that the connection between the fastener and the supporting structure be such as to provide virtually a firm interlock between the structure and the fasteners with which the molding is engaged. This is not essential in securing smaller moldings, a snap fastener engagement between the fastener and supporting structure being frequently entirely sufficient and satisfactory.

The primary purpose of the present invention is to provide an improved molding attaching clip or fastener that is capable of being readily fixedly applied to the supporting structure, and that is designed to then satisfactorily receive and hold a hollow molding regardless of whether or not such molding assumes a relatively extreme width.

Still another object of the invention is to provide a molding fastener having portions which may be turned through the opening in the supporting structure into fixed or interlocked engagement with said structure and having other portions with which the molding may be readily and satisfactorily engaged, regardless of the width of the molding.

This invention also aims to provide a molding fastener which may be constructed at low cost from rectangular strips of metal cut without waste, and which fastener is of such a character that untempered metal may be used in the construction of the fastener.

Still another object of the invention is to provide a fastener adapted for ready application to a supporting structure having elongated openings, of a character frequently used for the reception of molding clips or fasteners, the fasteners being designed to provide a hooked engagement with the supporting structure at lengthwise sides of said openings.

A still further object of the invention is to provide an improved method of securing moldings to a supporting structure having aligned elongated openings, consisting in the turning of the fastener into interlocked engagement with the supporting structure through said openings and the maintenance of the interlocks of the fasteners with said structure by the subsequent application of the molding to the aligned fasteners, said molding preventing the reverse rotation of the fasteners necessary to release the interlock between the fasteners and the supporting structure.

A still further object of the invention is to provide an improved combination of supporting structure, molding and interposed fastening means and resulting in a firmer engagement between the fastener and the supporting structure, and a firmer support and attaching means for the molding.

Still further objects of the invention will appear as the description thereof proceeds with reference to the accompanying drawing, in which:

Figure 1 is a fragmentary plan view showing a section of molding attached to a fragment of supporting structure by means of several of the fasteners constituting an essential part of the present invention;

Figures 2 and 3 are, respectively, longitudinal and transverse sectional views taken on the planes indicated by the lines 2—2 and 3—3 of Figure 1;

Figure 4 is a plan view of the supporting structure of Figure 1, the molding being removed to more clearly show the relation of the fasteners to said structure, one of the fasteners illustrated in said figure being located in the position it occupies before rotation toward its operative position;

Figure 5 is a sectional view taken on the plane indicated by the line 5—5 of Figure 4; and Figures 6 and 7 are, respectively, plane and side elevational views of the preferred form of fastener or clip, the fastener in these figures being shown on an enlarged scale.

Like reference characters indicate like parts throughout the various views.

Referring to Figures 1 to 5, inclusive, of the drawing, 10 designates a fragment of the supporting structure of an automobile or the like, to which a molding is to be applied in accordance with the present invention. Supporting structure 10 is provided with a multiplicity of aligned openings 11. The openings 11 are elongated and arranged with their major dimension extending lengthwise of the molding subsequently applied thereover.

The molding has a top portion 12, which may assume any ornamental configuration whatsoever. The molding also has side portions 13 and 14 which may be of any height. In the drawings said side portions are illustrated at right angles to the top portion 12 but any other disposition or shape of said sides may obviously be used. The molding also includes short inturned flanges 15 and 16. Preferably the edges of the flanges 15 and 16 are inclined somewhat toward the top portion 12 of the molding so that when the molding is applied the longitudinal edges thereof will lie snugly against the supporting structure 10.

Moldings, such as just described, are widely used in finishing and trimming various parts of automobiles and the like. The moldings are produced in varying shapes and widths. That which is illustrated in the drawing is a relatively wide molding to the adequate securement of which the present invention is particularly directed. Wide moldings, such as illustrated, have considerable inherent resilience which characteristic is utilized in the securement thereof in a manner presently to be described.

The fastener constituting an essential part of the present invention is illustrated by itself in Figures 6 and 7. It comprises an elongated strip of metal 17 of uniform width from end to end. The blank, from which the fastener is constructed, is originally a rectangular blank which may be cut without waste. It is not necessary to utilize spring metal in view of the fact that the fastening device need not yield substantially in applying the molding in a manner presently to be described. Slits are cut into the strip of metal from each end thereof separating central portions 18 and 19 which are curved upwardly and inwardly, as illustrated, providing molding retaining beads. Preferably the corner portions of the blank from which the fastener is constructed, designated 20, 21, 22 and 23, are maintained substantially in the plane of the blank. Said portions may extend beyond the beads 18 and 19 as illustrated.

Central portions of the body of the strip are cut to separate tongues from said body. Said tongues are bent inwardly and the ends thereof are disposed in substantial parallelism with the body of the strip producing offset portions 24 and 25. Said portions are connected to the body of the strip by connecting portions 26 and 27. Preferably said portions are curved transversely of the tongues as indicated at 28 and 29 in Figure 6, the curving of said portions being brought about by a die shaping operation, which preferably bends the ends of the tongues into offset relation to the body of the strip in the same operation.

The fastener just described is constructed so that the spacing of the molding attaching beads 18 and 19 exceeds slightly the normal spacing of the flanges 15 and 16 of the molding for the securement of which the fastener is constructed. Tangents to the curved walls 28 and 29, perpendicular to the longitudinal edges of the fastener strip, should be spaced when the fastener is completed, slightly in excess of the minor dimensions of the elongated opening 11 in the supporting structure 10. The dimension "a" on Figure 7, indicating the spacing between the beads on the end portions 24 and 25 of the tongues should be less than the major dimension of the elongated opening 11. Preferably the body of the strip is constructed so as to be cambered or arched slightly, as illustrated, particularly in Figure 7, though, if desired, said arching can be omitted.

In securing the molding to the securing structure by means of the fastener of Figures 6 and 7, the fasteners are first applied to the supporting structure through the elongated openings 11 in said structure, and the molding is subsequently applied to the fasteners after each elongated opening has a fastener assembled thereto.

In applying the fasteners to the supporting structure, each fastener is first arranged lengthwise of an opening so that the length of the strip extends in the direction of the major dimension of the elongated openings 11. As illustrated at the left of Figure 4 and in Figure 5, in this position tongues 24 and 25 are disposed directly over the opening 11. Pressure is then exerted against the body of the strip opposite the tongues in the direction indicated by the arrow 30 in Figure 5, such pressure serving to flatten the strip and cause the end portions 24 and 25 of the tongues to be disposed beyond the inner plane of the inner surface of the supporting structure 10. While the strip is thus maintained in flat condition the fastener is rotated in the direction of the arrow 31 in Figure 4 through an angle of 90° bringing the strip to the position shown at the right of Figure 4. When the strip is in the latter position, the transversely curved connecting portions 28 and 29 contact firmly against the lengthwise side walls of the elongated openings 11, and the end portions 24 and 25 of the tongues underlie and provide a hook-like engagement with the supporting structure as illustrated in Figure 3. When the pressure exerted against the body of the strip to flatten it is released after the strip has been turned to 90° as just stated, the end portions 24 and 25 of said tongues are caused to bear firmly and yieldably against the inner surface of the supporting structure adjacent the lengthwise sides of the openings 11. The strip is held in position accordingly by the friction between said ends of the tongues and the supporting structure and also by the firm engagement of the curved connecting portions 28 and 29 with the side walls of the opening. After a fastener has been applied to each opening, it will be understood that all of the fasteners will be accurately aligned and that they are then firmly frictionally held in aligned relation. The interlock provided by the tongues with the supporting structure is thus maintained frictionally prior to the application of the molding.

After the fasteners have all been applied and aligned, the structure is then ready to receive the molding which is applied by forcing the molding on the molding retaining beads 18 and 19 of the respective fasteners. This can be accomplished in a simple and ready manner by applying pressure against the outer wall of the molding after the flanges 15 and 16 have been brought opposite the beads 18 and 19. As pressure is exerted against the outside of the molding, the flanges are caused to separate by riding over the outer rounded surfaces of the beads 18 and 19, the inherent resilience of a wide molding, already referred to, permitting the separation of said flanges necessary to permit the molding to be sprung past said beads. In the final position of the molding, flanges 15 and 16 are engaged in the angles between the bead 19 and the projections 20 and 21 at one side of each fastener and in the angle between the bead 18 and the projections 22 and 23 at the other side of the molding. After the molding has been applied to the aligned fasteners, it will be readily understood that rotation of the fasteners necessary to free the portions 24 and 25 of the tongues from the supporting structure cannot occur. The molding thus serves to fixedly maintain the interlock between the series of fasteners with which it is engaged and the supporting structure. The molding is thus fixedly secured to the structure without relative or lost motion between the various parts of the complete assembly, and without liability of accidental detachment.

It will be understood that the fasteners may be constructed to suit any molding regardless of its width, and that fasteners such as described are well adapted to attach moldings without material projection of any part of the fastener, that is employed, beyond the inner surface of the supporting structure.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A rotary molding or like clip consisting in a rectangular strip of metal having intermediate end portions curved inwardly toward each other and providing molding engaging beads, and tongues struck from the body of the strip and bent so as to provide transversely curved connecting portions and portions disposed in offset relation and in approximate parallelism to said body, said last-named portions extending in opposite directions in substantially the same plane.

2. A rotary molding or like clip consisting in a rectangular strip of metal the body of which is cambered and intermediate end portions of which are curved inwardly toward each other and providing molding engaging beads, the corners of the strip being in the normal plane thereof and tongues struck from the body of the strip and bent so as to provide portions disposed in offset relation and in approximate parallelism to said body, said last-named portions extending in opposite directions in substantially the same plane.

3. A fastener comprising a longitudinally cambered strip of metal having oppositely extending tongues struck from and bent out of the plane of the body thereof, said tongues each including a straight end portion disposed in approximate parallelism to the body, and a portion convexly curved crosswise of the tongue and connecting said first-named portion to said body, whereby oppositely opening channels are provided the sides of which are formed by said first-named portion of each tongue and a side of said body and the bottoms of which channels are formed by said convexly curved connecting portions.

BION C. PLACE.